April 14, 1970 J. L. RENNICK 3,506,776

BALANCED PRODUCT MIXER OR DEMODULATOR AND MATRIXING SYSTEM FOR WAVE SIGNAL RECEIVERS

Filed April 10, 1967 3 Sheets-Sheet 1

Inventor
John L. Rennick
By Francis W. Crotty
Attorney

Inventor
John L. Rennick
By Francis W. Crotty
Attorney

April 14, 1970 J. L. RENNICK 3,506,776

BALANCED PRODUCT MIXER OR DEMODULATOR AND MATRIXING SYSTEM FOR WAVE SIGNAL RECEIVERS

Filed April 10, 1967 3 Sheets-Sheet 3

Inventor
John L. Rennick
By Francis W. Crotty
Attorney

United States Patent Office 3,506,776

Patented Apr. 14, 1970

3,506,776

BALANCED PRODUCT MIXER OR DEMODULATOR AND MATRIXING SYSTEM FOR WAVE SIGNAL RECEIVERS

John L. Rennick, Elmwood Park, Ill., assignor to Zenith Radio Corporation, Chicago, Ill., a corporation of Delaware

Filed Apr. 10, 1967, Ser. No. 629,764

Int. Cl. H04n *9/50*

U.S. Cl. 178—5.4 18 Claims

ABSTRACT OF THE DISCLOSURE

A balanced product mixer has no inductors but includes two differential transistor amplifiers with cross coupling from a collector of one amplifier to a collector load impedance of the other. The modulated signal and the demodulating signal are applied to the amplifiers with such relative phase that the modulation products, developed in that load impedance as a consequence of its being in the circuit of both amplifiers, augment one another, whereas components developed in that same impedance but representing the applied modulated and demodulating signals cancel one another. For application to a color television receiver, as a color demodulator, a pair of such product mixers are used in conjunction with a resistive matrix for developing output signals to drive a common emitter active matrixing system which develops directly a plurality of color-control signals for controlling a color picture tube even though these control signals themselves may not sum to zero. The disclosed circuitry is well suited to integrated-circuit construction.

BACKGROUND OF THE INVENTION

The invention, so far as it concerns a balanced product mixer, has a wide field of application and lends itself particularly well to both the reception of color television broadcasts and radio broadcasts of the FM stereo type. In each instance, the transmission includes, as one component, a suppressed-carrier amplitude and/or phase modulated signal which is most conveniently demodulated in a synchronous demodulator or detector. The demodulator of the invention lends itself especially well to accomplishing that function.

In a three-color television system, either the demodulation process directly derives the three color-control signals required for image reproduction in simulated natural color, or two such signals are obtained by demodulation and supplied to a matrix constructed and arranged to develop the third by operating within the matrix upon the two demodulated signals. The invention, so far as it pertains to an active matrixing system, is particularly useful in the latter environment.

Both the demodulator and matrix structures here proposed have the further attractive attribute of being especially well suited for production in integrated circuit form, lending themselves to monolithic, thin film and thick film fabricating processes.

The demodulator, for example, departs structurally from the many balanced demodulators known to the prior art in that it is inductorless, that is to say, requires no inductors for achieving those properties characteristic of a balance demodulator. This points directly to its extraordinary application to integrated circuitry wherein transistor and resistor components are made with facility, while inductors, at least in the present state of the art, can not be made as integral components of an integrated circuit.

So far as the matrix arrangement is concerned, here again the invention represents a distinct advance over the art both in the ease of its production as an integrated circuit and in improving the construction of the chrominance channel of a color receiver. It is, in fact, a further development of applicant's Patent 3,180,928, issued Apr. 27, 1965, and assigned to the assignee of the present invention.

The earlier patent discloses what is known as an active matrix which, among other features, simplifies deriving three color-control signals in a receiver which has available demodulated signal components representing two colors of the image being translated. In a preferred form, the structure uses three active devices such as triodes or transistors which have a common cathode or common emitter impedance. The input electrodes of two of the three active devices receive the two color-control signals derived from the demodulator while the input electrode of the third is maintained at a reference potential. With this arrangement, three color-control signals are available at the respective plate or collector load impedances of the active devices. If the color transmission is of the now abandoned symmetrical type with a brightness signal having equal contributions of red, blue and green, the color-control signals obtained from the active matrix are color-difference signals which, added vectorially, sum to zero which is uniquely compatible with the peculiar property of the common cathode or common emitter active matrix that the output currents of its active devices also sum to zero. With the departure of the art from symmetrical transmission to the commercially practiced NTSC form, featuring a luminance signal with unequal contributions of red, blue and green, the same type of active matrix remained attractive and useful although its specific circuit construction and operation had to be modified to make allowance for the differences in the whiteness signal of the symmetrical system and the luminance signal of the NTSC system. In the present and further developed form of the active matrix described herein, it is convenient to accommodate the NTSC signal in a receiver predicated upon normalizing chromaticity at illuminant C or in a receiver conforming to present practice in which normal light is chosen near 9300° K. instead of illuminant C.

It is an object of the invention to provide a novel balanced product mixer useful, for example, in the color demodulation system of a color television receiver.

It is another object of the invention to provide an improved active matrix system of the common cathode or common emitter type for a color television receiver.

Still another object of the invention is the provision of a novel combination of an improved balanced color demodulation system and an improved active matrix for deriving color-control signals for use in reproducing television images in simulated natural color.

It is a specific object of the invention to provide novel combination of differential amplifiers collectively useful as a balanced product mixer and especially suited for integrated circuit production.

SUMMARY OF INVENTION

A balanced product mixer or demodulator, in accordance with the invention, comprises a differential amplifier including a pair of balanced transistors individually having input, output and common electrodes. A load impedance is connected to at least one of the output or collector electrodes and a high impedance is connected to the common or emitter electrodes as a signal source for applying a first input signal to the mixer. A second signal source connects to the input or base electrode of at least one of the transistors for applying a second signal to the mixer which signal has an alternating component of peak-to-peak amplitude sufficient to cause the transistor pair to be conductive in alternation and function in the manner of synchronous detectors. This develops in the collector load impedance a first set of signal components corresponding to the first and second input signals and to their product. The mixer additionally comprises inductorless circuit means coupled between the first and second signal sources and the collector load impedance, for additionally deevloping in that load impedance a second set of signal components. Like the first set, this second set has components representing the first and second input signals to cancel the corresponding components of the first set and further has a product component to augment that of the first set.

In a specific application to color demodulation, the arrangement preferably has a second differential amplifier which receives the same two input signals as the first amplifier although in a particular phase with respect thereto, and there is a cross coupling from the collector of a particular transistor of the second amplifier to a collector load impedance of the other amplifier. The signals applied to the differential amplifiers in this case are the chrominance and demodulating or injection signals but because of the described cross connection of the collector to the collector load impedance of the two amplifiers those components representing input signals cancel one another in the collector load impedance, leaving only their product or the desired color-control signal as the useful and effective output of the demodulator.

The matrix system of the invention cooperates particularly well with such a balanced demodulator as a driving source. Again, in the environment of a color receiver requiring $n$ color-control signals to reproduce an image, the matrix comprises $(n+1)$ active electron devices individually having input, output and common electrodes. A high impedance is connected to the common electrodes of all such devices and individual load impedances connect with the output electrodes of the devices, respectively. Means, such as a pair of balanced color demodulators of the type described above, apply at least $n$ color-control signals to the input electrodes of assigned ones of the active devices, respectively, to develop in the load impedances of the active devices of the matrix $(n+1)$ modified color-control signals, the summation of which equals zero. Finally, the matrix has means for deriving output signals from $n$ of the load impedances for utilization in image reproduction.

A preferred arrangement of the demodulation and matrix system for three color reception features two balanced color demodulators for deriving a pair of balanced color-control signals and further includes an additional matrix in the demodulation system to which the pair of balanced color-control signals are applied. The color-control signals represent two color components of an image and are derived preferably in two balanced demodulators having equal gain and appropriately phased demodulating signals. The matrix of the color demodulation system produces three output signals having, as common-mode information, a signal representing the third color component of the image being transmitted. These three signals obtained from the demodulation system are applied to an active matrix having four active devices, tubes or transistors, one of which receives no driving signal. All these devices have a common high impedance connected to their cathodes or emitters and because of the inherent property of such a network, in eliminating common-mode information from its driving signals, that particular one of the active devices develops in its load impedance a desired color signal corresponding to the common-mode information of the input signals while two of the others develop in their respective load impedances the remaining two desired color signals corresponding to two of the applied signals minus common mode information. These three signals developed in the active matrix may be of the color-difference variety to be applied to the color tube along with the luminance signal for internal matrixing to develop the required primary color signals, or by utilizing a luminance signal source as the common emitter impedance of the matrix, outputs in the form of the required primary color signals may be taken directly from three load impedances of the active matrix for direct application to the color reproducing device.

Subsidiary features of the invention include a unique combination of saturation-mode differential amplifiers driven by a linear-mode differential amplifier as well as a novel resistive matrix for combining signals from several sources to develop outputs of desired phase and relative amplitude.

The following definition of terms is applicable to this description and will facilitate an understanding of the arrangements disclosed and claimed:

Primary color signal—a signal representing a color of constant chromaticity and variable amount and usually representing one of the tristimulus values with respect to a stated set of primaries;

Color-difference signal—a signal which when added to the monochrome signal produces a primary color signal.

Color-control signal—a signal representative of hue and/or saturation, a generic term including primary color signal and color-difference signal.

DESCRIPTION OF THE PREFERRED EMBODIMENTS

Figure 1:
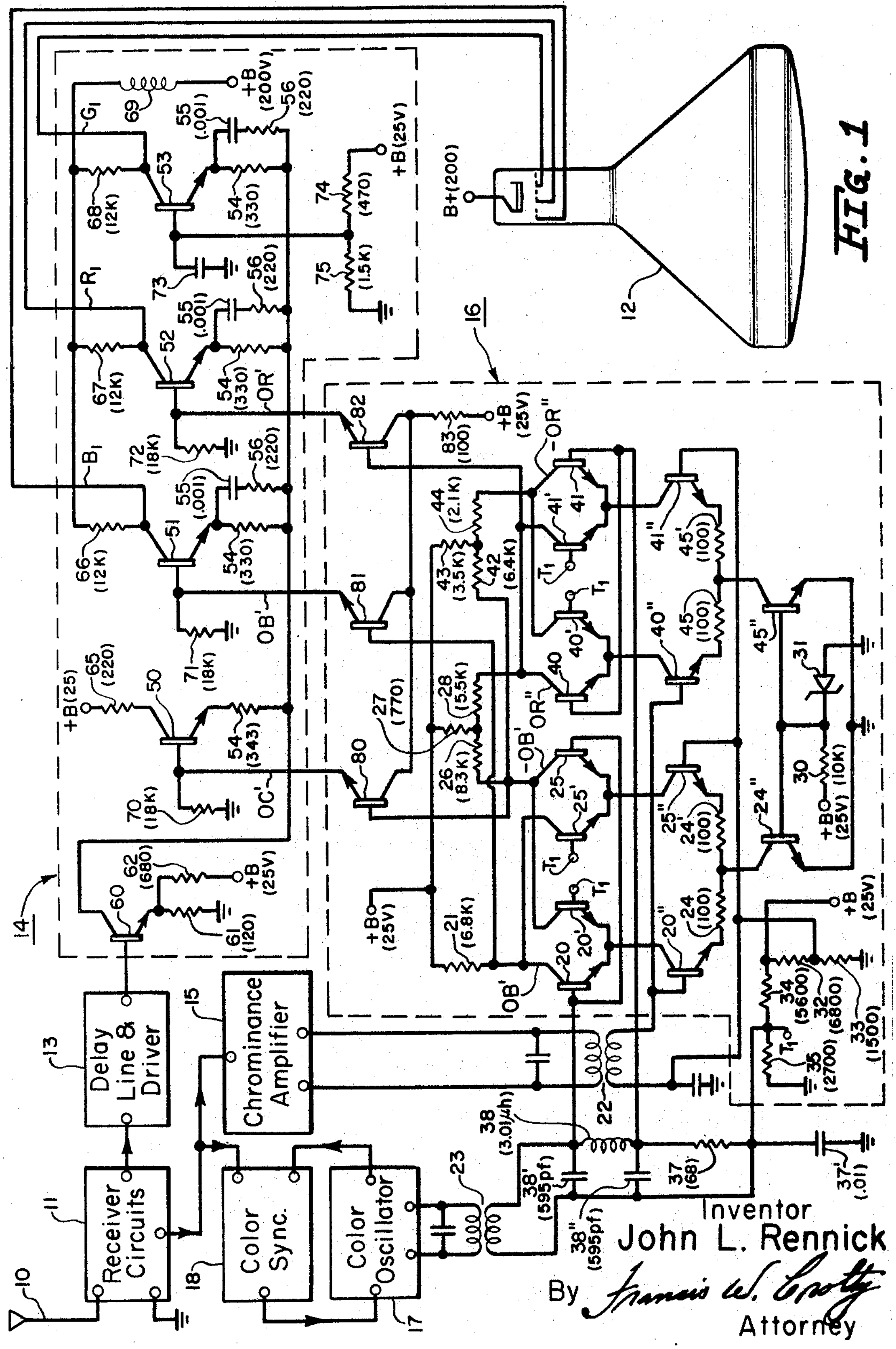
FIGURE 1 is a representation, partially in block form, of a color television receiver embodying both a balanced demodulation system and a matrixing system constructed in accordance with the invention.

Referring now more particularly to FIGURE 1, the color television receiving apparatus there represented is intended to process a color program signal in accordance with the NTSC specifications. This signal has a luminance component Y representing brightness information of an image and a chrominance component which is a subcarrier that has been suppressed-carrier-modulated in phase and amplitude with hue and saturation information, respectively, of the same image. There is an audio signal but since it is of no concern to the invention, the audio portion of the receiver, which may be entirely conventional, has been omitted from the representation.

The program signal is intercepted by an antenna 10 and delivered to the receiving circuits of the receiver represented by the block 11. This portion of the receiver includes those stages at least down to and including the picture detector and which constitute no part of the present invention. They include, for example, a tunable selector and local oscillator, unicontrolled to select any desired channel in the VHF or UHF spectrum. The selected channel signal is converted to the intermediate frequency of the receiver and after amplification is applied to the picture detector where the luminance and chrominance signals are derived for further processing in signal stages to be described more particularly hereafter. The receiver has the usual scanning and high voltage systems for developing the deflection signals and the operating potentials required for proper operation of a shadow mask type of three-color cathode-ray tube 12 which is shown in fragmentary form since it, likewise, is of conventional design. The synchronizing information of the received signal controls the scanning systems to function in a properly timed relation to the signal deriving apparatus of the transmitter. There is also an automatic gain control for maintaining substantially constant intensity of the signal input to the picture detector and there may be an automatic frequency control for maintaining precise adjustment of the heterodyning oscillator. Since none of these components, necessary as they may be for optimum operation of the receiver, constitute a particular part of the present invention, they have not been illustrated and need not be considered further.

At the output of the picture detector, the signal processing stages are arranged effectively in two channels, one devoted primarily to luminance and the other to chrominance. In the luminance channel, there is the usual delay line and driver 13 and, if the receiver is of the transistor type, there frequently is an emitter follower between the picture detector and unit 13. This unit may, likewise, be followed with an emitter follower (not shown) in order that a matrixing system included within the broken-line rectangle 14 and described more particularly hereafter may constitute no load on the delay line.

The chrominance channel comprises a frequency selective chrominance amplifier 15 which accepts only the chrominance signal of the received program for application to a demodulation system enclosed within broken line rectangle 16 and also discussed more particularly hereafter. Demodulating signals for demodulation system 16 are derived from a color oscillator 17 which produces a signal of sinusoidal waveform and of a frequency corresponding to the fundamental frequency of the chrominance subcarrier. It is phase synchronized to color burst information contained in the program signal by means of the customary AFC or color sync unit 18 which receives the color bursts of the received signal from unit 11 as well as an output from oscillator 17 to compare their phase and develop a correction voltage, if necessary, to establish and maintain a condition of phase lock. Generally, the color sync arrangement is gated to respond only to color burst information but here again this is entirely conventional.

It should also be mentioned in passing that image reproducer 12 has dynamic and static convergence circuitry which have not been shown because they too may be entirely conventional.

More particular consideration may now be directed to demodulation system 16, here employed to demodulate the chrominance signal and develop a pair of balanced or push-pull color-control signals from which can be derived the three particular color-control signals required by the receiver under consideration in the reproduction of images in simulated natural color. Demodulation of the chrominance signal at two suitably phase-displaced points to develop two color-control signals is well understood. The present invention, however, featuring a balanced inductorless demodulator especially suited for integrated circuit processing, is believed to be a distinct departure from the prior art. Basically, the arrangement is made up of two balanced product mixers, each of which receives the chrominance signal and a demodulating or injection signal, the former being applied to the two mixers in phase opposition and the latter with a desired phase displacement.

The first such mixer of unit 16 comprises a first differential amplifier which, per se, is of well-known construction. This amplifier has a pair of balanced, preferably identical, transistors 20, 20′ individually having input, output and common electrodes more conventionally referred to as base, collector and emitter electrodes respectively. A load impedance 21 connects to the collector of transistor 20 and to a unidirectional voltage source +B while a high impedance current source is connected in common to the emitters of transistors 20, 20′ and serves to apply a first input signal, specifically the chrominance signal, to this mixer. Where the common emitter impedance is to serve as a signal source, it conveniently comprises a third transistor 20″ preferably identical in structure to the other transistors. The collector-emitter path of transistor 20″ which presents a high impedance is connected in common with the emitters of transistors 20, 20′, and the input or base electrode of transistor 20″ is an input to which the chrominance signal may be applied through a tuned transformer 22. The primary of this transformer is resonant to the fundamental of the chrominance signal which it receives from the output of amplifier 15. One terminal of the secondary connects to the base of transistor 20″, while the other terminal is bypassed to ground for signal frequencies by the illustrated capacitor.

A second signal source connects to the input or base electrode of at least one of transistors 20, 20′. For the color application under consideration, this second signal is the injection or demodulating signal and is applied to the base of transistor 20 from oscillator 17 through the secondary of a tuned transformer 23.

In order to attain a balanced demodulator with inductorless circuit connections, the product mixer comprises additional means coupled between signal sources 15 and 17, on the one hand, and load impedance 21 on the other hand, for developing in load impedance 21 of the differential amplifier a set of signal components which cancel unwanted signal components otherwise developed in that load and which, at the same time, augment the desired modulation-product signal components developed in that load. More specifically, this additional means comprises a second differential amplifier which is similar to that just described and comprises transistors 25, 25′ and a third transistor 25″ serving as a common emitter impedance to the first two. Resistors 26 and 27 connect the collector of transistor 25 to the same potential source +B to which resistor 21 connects the collectors of the first described amplifier. The collector of transistor 25′ is conductively connected to collector load 21. To provide for derivation of balanced outputs from the demodulator, there is a corresponding conductive connection from the collector of transistor 20′ to collector load 26.

Necessarily, the condition of balanced or push-pull outputs requires proper phase relations of the signals applied to the described amplifiers collectively functioning as a balanced product mixer. To that end, the emitters of amplifiers 20″, 25″ are connected to a common high impedance to constitute therewith a third differential amplifier operating in its linear mode. In particular, the emitters of transistors 20″, 25″ connect through resistors 24, 24′ to the collector-emitter path of yet another transistor 24″ having its emitter coupled to a plane of reference potential, such as ground, and its base suitably biased from a network provided by potential source +B and a resistor 30 connected in series with a Zener diode 31 to ground.

The operating biases for the other transistors of the described differential amplifiers are derived from another supply comprising potential source +B and a network of resistors 32, 33, 34 and 35. A connection from the junction of resistors 34, 35 through the secondary of transformer 23 applies a bias to the base electrodes of transistors 20, 25. A like bias available at terminal T1 is applied to the similar terminals of the transistors 20′, 25′ although the specific connection has been omitted for the sake of simplicity. The junction of resistors 32, 33 connects through the secondary of transformer 22 to the base of transistor 20″, applying a bias thereto. The same junction of the power supply is connected as illustrated to the base of transistor 25″, which is also connected to the other terminal of the secondary of transformer 22.

Figure 2:
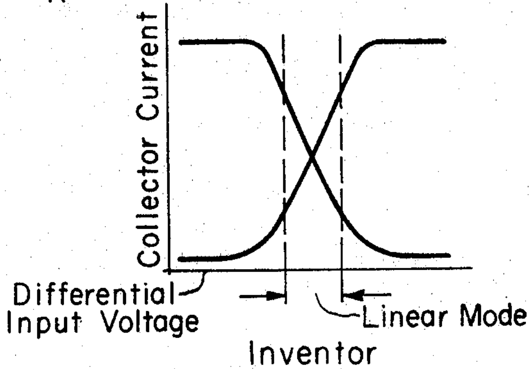
FIGURE 2 are characteristic curves of a differential amplifier.

In considering the operation of the described balanced demodulator, it will be apparent that the injection signal from oscillator 17 is applied to the base of transistors 20 and 25 in the like phase. The injection or demodulating signal has an alternating current component of peak-to-peak amplitude to cause transistors 20, 20' to be conductive in alternation; preferably, the peak-to-peak amplitude overdrives the transistors to effect operation in a saturation mode with substantially a 50 percent duty cycle much as though the driving signal were of rectangular wave form. Concurrently, the chrominance signal is effectively applied in opposite phase to the input electrodes of transistors 20'' and 25'' of the linear-mode differential amplifier and, therefore, to the emitters of transistor pairs 20, 20' and 25, 25' with opposite phase. The response of the differential amplifier comprising transistors 20, 20' and 20'' to the applied signals is to develop in load impedance 21 a first set of signal components corresponding to the chrominance and injection input signals and to their modulation product. The manner in which a differential amplifier operates as a product mixer is well known to the art. The curves of FIGURE 2 are characteristics showing the collector currents of transistors 20, 20' for example as a function of differential input voltage. The broken-construction lines show an operating range over which the characteristics are essentially linear and beyond which saturation mode operation begins to take place. This, too, is known in the art.

At the same time that the first product mixer operates as indicated to develop a first set of signal components in collector load 21, the second product mixer comprising transistors 25, 25' and 25'' likewise responds to the same input signals to develop a second set of like signal components. While the demodulating signal is applied to transistors 20 and 25 in like phase, it is effectively applied to transistors 20 and 25' in phase opposition. As previously indicated, the chrominance signal applied to the emitters of transistors 25 and 25' is in phase opposition in relation to that applied to the emitters of transistors 20, 20'. Therefore, the collector current of transistor 25' develops in collector impedance 21 a set of signal components in which those corresponding to the chrominance and demodulating signals cancel the corresponding components developed in this load by collector current of transistor 20. However, the modulation-product signal components of the collector currents of transistors 20 and 25' are in like phase in load impedance 21 and augment one another.

At the same time, differential amplifier 25, 25' develops a similar set of signal components in its collector load impedance 26 and, since the collector of transistor 20' is cross-coupled to load 26 still another set of such signal components is developed in load impedance 26 in response to the collector current of transistor 20'. By tracing the phase relations of the signals effectively applied to transistor 25 and to transistor 20' in a manner similar to that undertaken above, it may be demonstrated that signal components representing the demodulating and chrominance signals cancel one another in the collector load 26 of transistor 25 while the modulation-product signal components developed in the two product mixers augment one another in load impedance 26. It is distinctly preferred that differential amplifiers 20, 20' and 25, 25' have equal gains to achieve substantially complete cancellation of unwanted signal components in the collector load impedances 21 and 26 and to have equal collector currents in transistors 20, 20' and 25, 25' as required to achieve demodulated outputs of equal amplitude. If this operating condition is satisfied, there is developed in the collector loads of the two differential amplifiers a pair of balanced or push-pull color-control signals. By appropriately selecting the phase of the demodulating signal input, this signal pair may represent any chosen color component of the image being transmitted.

Of course, for image reproduction in a three-color system, it is necessary that at least two different color-control signals be developed by demodulation of the chrominance signal at appropriate different phase angles. For this reason, demodulation system 16 does indeed have a second balanced demodulator which is of the same construction as that previously described. Its first differential amplifier includes transistor pair 40, 40' and a transistor 40'' as a common emitter impendance also serving to apply the chrominance signal by the connection of its base to transformer 22. Its second amplifier includes transistors 41, 41' with a third transistor 41'' as a common emitter impedance, the latter transistor constituting along with transistor 40'', resistors 45, 45' and yet another transistor 45'' a linear-mode differential amplifier. The collector of transistor 40 connects through resistor 28 and 27 to potential source +B. The collector of transistor 41 similarly connects to this source through resistor 44, 43. Again, the collectors are cross-coupled; specifically the collector of transistor 41' connects to load impedance 28 and the collector of transistor 40' connects to load impedance 44. The demodulating signal is applied to the bases of transistors 40, 41 from oscillator 17 through coupling transformer 23 and a phase shifting network comprising an inductor 38 and shunt capacitors 38', 38''. Resistor 37 provides a termination for this network being bypassed to ground through a capacitor 37'. This demodulator, provided by differential amplifiers 40, 40' and 41, 41', responds to the demodulating and chrominance input signals and, being balanced with respect to its inputs, develops a pair of opposite-polarity signals corresponding to the modulation products representing a second color of the image being translated. For reasons to be made clear hereafter, the demodulating signal as applied to transistors 20, 25 is at $-14.2°$ with respect to the $(B-Y)$ reference axis, and the phase displacement of the demodulating signal as applied to transistors 40, 41 is approximately $-84.7°$ relative to the demodulating signal applied to transistors 20, 25.

The transistors of this second demodulator have equal gains so that their average collector currents are of equal intensity. Additionally, both demodulators preferably exhibit the same gain.

The description to this point has concerned only the fundamental components and the intermodulation products of the chrominance and injection signals and it has been explained that the fundamental components cancel whereas the modulation-product signal components are enhanced. Actually, harmonics of the applied signals are also present but the odd harmonics cancel out just as the fundamental. The even harmonics are of no consequence because the frequency response of the subsequent portions of the receiver slope off at the high end of the video spectrum and translate to no significant extent frequencies as high as the second and higher order harmonics.

Since demodulation system 16 has only a pair of balanced demodulaotrs, it is capable of developing the demodulation process only two balanced color-control signals which may, for example, represent red and blue. The art understands that the necessary third or green signal may be developed by matrixing of the two developed by the color demodulators; for the receiver under consideration, this is accomplished in the novel arrangement of unit 14. This unit is a so-called active matrix and while it may employ tubes or transistors, the latter have been illustrated and it is, therefore, convenient to refer to this as a common emitter matrix.

Unit 14 has $(n+1)$ active devices or transistors, where $n$ is the number of color-control signals that the receiver requires to reproduce an image in simulated natural color—three for the case at hand. The active devices are similar to one another and comprise four balanced and preferably identical transistors 50, 51, 52 and 53. As shown, each has an individual emitter impedance 54 and, as indicated in the drawing, three of the transistors 51–53 are intended to drive the three grids of the tri-color shadow-mask cathode-ray tube 12. It is known that the signal grids of such a tube exhibit an input capacitance which may adversely affect signal translation at the high-frequency portion of the video spectrum and accordingly peaking circuits are connected in shunt to the individual emitter resistors 54 of transistors 51–53. Each such circuit includes a capacitor 55, series connected to a resistor 56. There is a high emitter impedance common to all four transistors 50–53. As shown, this is the collector-emitter circuit of a transistor 60 having an emitter resistor 61 to which an operating bias is applied from source +B through a resistor 62. The common emitter impedance of this matrix should be at least five to ten times the value of the individual emitter impedances 54. The transistors 50–53 have individual load impedances 65–68 connected to their collectors, respectively and through which an operating current is derived from a source B+ of higher positive unidirectional operating potential than that of source +B. Since no output is taken from transistor 50, it has its individual connection to low-voltage source +B, whereas the B+ connection for the remaining amplifiers is through a common shunt peaking coil 69. The base electrodes of transistors 50–52 connect to ground through like resistors 70, 71, 72 serving as emitter loads for transistors 80–82 to be considered hereafter, whereas the base of transistor 53 is maintained at signal ground by a bypass capacitor 73. This base also connects to a bias supply comprising source +B and series connected resistors 74 and 75.

The common emitter matrix 14 further has means for applying at least $n$ color control signals to the input electrodes of assigned ones of its active devices, respectively, to develop in the load impedances of the matrix $(n+1)$ modified color-control signals the summation of which equals zero. More specifically, this means comprises connections from demodulation system 16 to the common emitter matrix by which three color-control signals are applied to transistors 50–52, the input to the remaining transistor 53 being operated at signal ground as stated. Units 14 and 16 are interconnected by transistors 80, 81 and 82, the collectors of which connect through a common resistor 83 to potential source +B while the emitter circuits thereof are individually completed through resistors 70–72, respectively. The bases of transistors 80–82 connect to still another, but passive, matrix that is included in demodulation system 16.

The passive matrix included within demodulation system 16 comprises the resistors connected to the collectors of its various transistor pairs 20, 20′, 25, 25′, 40, 40′ and 41, 41′. The manner in which the parameters of the matrix are derived and the philosophy of the matrix function will be considered in relation to the vector diagram of FIGURE 3. Suffice it now to state that the matrix of the demodulation system provides driving signals for common emitter matrix 14 of such composition that desired modified color-control signals are developed in the load impedances of transistors 51–53 for direct application to the grids of picture tube 12. This makes allowance for, and takes advantage of, the fact that common mode information of the driving signals is eliminated in the common emitter matrix 14. Further the common emitter matrix is distinguished by the fact that its output signals derived from transistors 51–53 do not sum to zero. The connections from the collector load impedances of matrix 14 to the grids of tube 12 serve as the means for deriving output signals from $n$, specifically three, of the active devices for utilization in image reproduction.

In describing the operation of common emitter matrix 14, it is appropriate first to discuss the specifications of the output signals to be derived from this matrix for application to image reproducer 12 and then the arrangement of demodulation system 16 necessary to supply properly correlated input signals to matrix 14. For this purpose, reference is made to the chrominance vector diagram of FIGURE 3 wherein vectors OB, OR and OG are gain vectors which determine a set of three signals which may be employed (after either internal or external matrixing with the luminance signal Y) to control the beam currents of the three guns of tri-color tube 12 to achieve reproduction of a color image with normal white chosen near 9300° Kelvin. Expressed mathematically, these vectors are so selected that, to reproduce a white field, the compositions of the effective net control signals applied to the three electron guns of picture tube 12 are as follows:

$$\text{red gun signal } R_1 = .464B + 1.248R - .784G \quad (1)$$
$$\text{blue gun signal } B_1 = 1.099B - .289R - .810G \quad (2)$$
$$\text{green gun signal } G_1 = .008B - .318R + .310G \quad (3)$$

rather than the pure primary color signals R, B and G respectively.

It is also to be noted that in the vector plot a unit on the abscissa scale is .493 $(B-Y)$ and a unit on the ordinate scale is .877 $(R-Y)$, and $(B-Y)$ as well as $(R-Y)$ are in accordance with the broadcast specifications for NTSC color. R, B, and G, are the signal voltages that are to be derived from collector load impedances of transistors 51, 52 and 53 in active matrix 14. And since the transistors have resistive loads of equal value, vectors OB, OR and OG of FIGURE 3 may be considered to represent current or voltage gains. One property of such a matrix is that the output currents of its active devices sum to zero but the desired current gain vectors OB, OR and OG of FIGURE 3 do not, in fact, add to zero. Provision of a fourth active device 50 in the matrix, in accordance with the invention, permits the generation of the desired three output signals notwithstanding their non-complemental character by operating device 50 to generate an unused output signal determined by a fourth current gain vector OC of such angular relation and scalar value as to have the four current vectors OR, OB, OG and OC add to zero.

In seeking to obtain the desired output signals of the active matrix, it is recognized that the starting point is the pair of balanced vectors ±OR″ and ±OB′ that are proportional to the collector load currents of the two demodulators of the demodulation system 16. The passive matrix of demodulator 16 has been developed empirically by starting with a $\pi$-type matrix and later converting to an equivalent Y-type circuit comprising resistors 26–28 and 42–44. The $\pi$-type circuit is shown in FIGURE 3*a*, where currents $i_1$ and $i_3$ are the balanced currents proportional to vectors OB′ and —OB′ whereas currents $i_2$ and $i_4$ are determined by vectors OR″ and —OR″, these currents being the collector currents at the points indicated by corresponding vector designations in demodulation system 16. The direct-current components of currents $i_1$ through $i_4$ are all equal because the two demodulators of unit 16 are similar to one another in construction and have equal gains. These currents flow into the input terminals $e_1$ through $e_4$ of the matrix which has series resistors R of equal value, chosen of equal value so that corresponding points in the matrix are maintained at the same direct current level. The matrix, is completed by the additional resistors $R_{23}$ and $R_{34}$ connected between terminal pairs $e_2$, $e_3$ and $e_3$, $e_4$ to provide cross-coupling between the paths of currents $i_2$, $i_3$ and $i_4$ for the development of modified signals proportional to other vectors for a purpose to be described. Necessarily, the sum of the signal currents $i_1$ through $i_4$ is zero and additionally signal voltages $e_1$ through $e_4$ total to zero since the input currents are balanced and this is a resistive matrix with equal series resistors R. With such a matrix, the direct-current voltage level at terminals $e_1$ through $e_4$ is unaffected by signal variations and is also constant and independent of the presence or absence of signals in any or all branches; there is no direct-current flow through resistors $R_{23}$ and $R_{34}$ because they are each connected between points of equal D.C. potential. Thus, the use of the matrix of FIGURE 3*a* in the output circuits of the two balanced demodulators of system 16 results in maintaining the collectors of all the demodulator output transistors at a constant equal D.C. potential, and this D.C. potential can be employed as a bias voltage for subsequent stages thus eliminating the need for blocking condensers, diode clamping circuits or separate bias sources for the transistors of active matrix 14. This desirable condition has been found to be not practically realizable if the demodulator output signal currents determined by vectors ±OB′ and ±OR″ are directly applied to the common emitter active matrix.

In accordance with an important preferred feature of the invention, the current vectors ±OB′ and ±OR″ of the demodulation system 16 are operated upon by the passive matrix of the system to develop modified input-signal-determining gain vectors for active matrix 14, the modified vectors differing from those required for the development of the desired color-control drive signals for picture tube 12 by the addition to each of certain predetermined common-mode information which in turn is deleted by the operation of the common emitter active matrix.

By way of illustration, consider transistor 51 of active matrix 14. Its collector current is in accordance with the following:

$$I_{C51}=\frac{V_{B51}-V_E}{R_{51}} \quad (4)$$

where $V_{B51}$=base voltage of transistor 51

$V_E$=voltage drop of the emitter impedance of transsistors 50–53.

$R_{51}$=the emitter load individual to transistor 51.

Like expressions may be written for the remaining transistors of the matrix and they demonstrate that the collector currents do not contain the common mode information $V_E$. Since the common-mode information is a function of the emitter currents of all the transistors in the matrix, it is subject to determination and control by adjustment of the parameters, such as voltages and resistors, of the matrix and this property is used in arriving at the specifications required of the input signals to the matrix. In particular, it is arranged that the common-mode information of the input signals corresponds to the gain vector —OG of FIGURE 3.

It is especially advantageous to select —OG as the predetermined common-mode information because with this choice of common-mode information, which is later subtracted from all inputs to the common-emitter matrix due to the inclusion of the common emitter impedance, the transistor 53 from which the green color-control signal is derived can be operated with its base bypassed to ground because the common-mode information is exactly equal in magnitude and opposite in phase to the desired green-signal-determining vector OG. Accordingly, with this transformation, only three signals are required and are used to drive common-emitter matrix 14.

One further degree of freedom is afforded by the active matrix in effecting the necessary transition from the balanced collector currents of the demodulation system to the three particular input signals needed for the matrix so that the desired signal voltages become available for application to image reproducer 12. Specifically, the emitter load individual to transistor 50 may be made different in value from that of the remaining transistors 51–53. Accordingly, having chosen the aforedescribed common-mode information for the input signals of the active matrix, the parameters available for adjustment to satisfy the signal conditions of the demodulation system 16 and active matrix 14 are the matrix resistors 26–28, 42–44 and emitter resistor 54. It has been found that this is sufficient to develop the required input signals for active matrix 14 while at the same time preserving the desired D.C. condition of the passive matrix explained above and also preserving identity of emitter and collector circuits for those transistors 51–53 of the active matrix from which an output signal is taken for picture tube 12.

Figure 3:
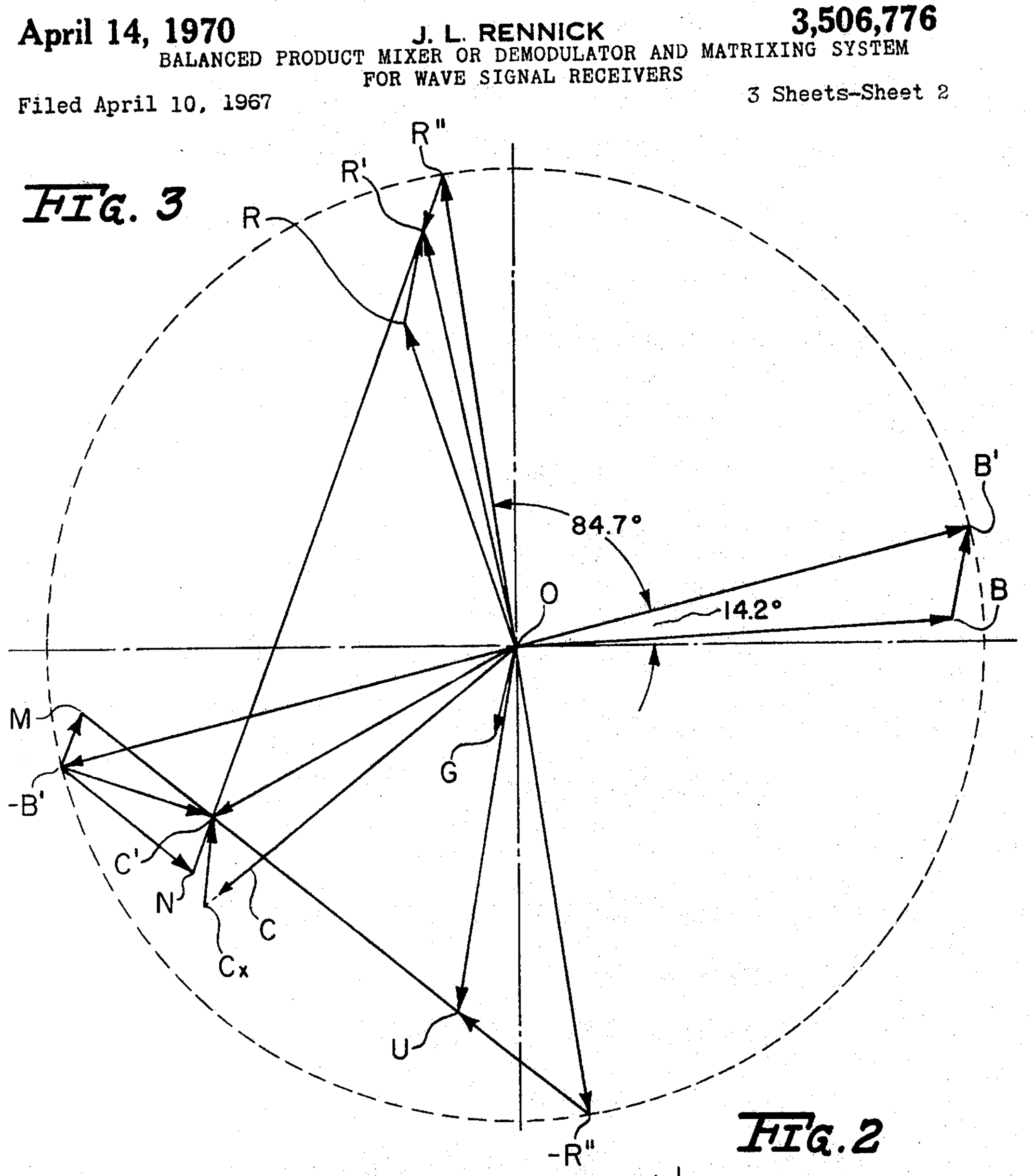
FIGURE 3 is a vector diagram utilized in explaining matrixing accomplished within the two color demodulator of FIGURE 1.
Figure 3A:
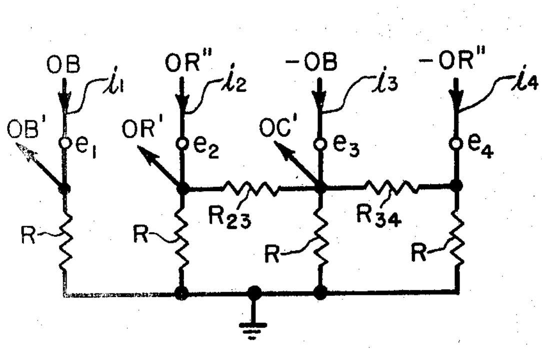
FIGURE 3*a* shows a $\pi$-type matrix that may be used in the color demodulator.

In practice, the emitter resistor 54 of transistor 50 is increased slightly in value relative to the individual emitter loads of transistors 51–53 which is permissible if the base voltage $V_{B51}$ thereof is likewise increased to the end that the collector current $I_{C51}$ defined in Equation 4 remains constant, that is as represented by current gain vector OC in FIGURE 3 to satisfy the requirement that the collector currents of active matrix 14 sum to zero. The increase in the voltage gain vector is the dotted extension of vector OC, an extension of this vector because the current and voltage are in phase since the circuit is resistive. The voltage-gain vector is $OC_X$.

The passive matrix in the output of the color demodulators is preferably designed to operate upon the vectors ±OB′ and ±OR″ in such a manner as to develop modified vectors OR′ and OC′ which represent vectorial additions of —OG to the desired vector OR and to the extended vector $OC_X$. The third required signal is represented by vector OB′. It corresponds to the vectorial addition of —OG to desired output vector OB.

It will be observed from FIGURE 3 that the three output signals OB′, OR′ and OC′ are of generally similar magnitude and the largest, which is proportional to vector OB′, is obtained by direct demodulation of the chrominance signal at an angle of —14.2° from the $(B-Y)$ axis and with a relative gain of 2.75. This is the signal proportional to gain vector OB′ which is developed at collector load 21 of demodulation system 16 and applied through transistor 81 to active device 51 of the common-emitter matrix 14. The other two signals are obtained by proper proportioning of the resistors of the matrix connected to the collectors of the color demodulators.

Since the four signal currents flowing into the matrix must always add to zero and since the matrix signal voltages $e_1$ through $e_4$ likewise add to zero, the vector OB′, OR′ and OC′ determine the necessary fourth vector OU. Its phase and scalar value are such that these four vectors total to zero. Actually, vector OU is developed at terminal $e_4$ and is not used in generating any needed color-control signal, and it will be observed that no signal is taken from the collector load 44 of transistor 41 in demodulation system 16.

Resistors $R_{23}$ and $R_{34}$ in the matrix of FIGURE 3*a* are selected to be of such value that the signal currents therein are proportional to modifying vectors of such magnitude and phase angle that, when vectorially added to the signal determining vectors OR″, —OB′, and —OR″ at terminals $e_2$, $e_3$ and $e_4$ respectively, the vector resultants at these terminals are OR′, OC′ and OU respectively.

The modifying vector R′R″, which is determined by the signal current from terminal $e_3$ to terminal $e_2$ and is added to vector OR″ at input terminal $e_2$ to produce desired modified vector OR′, is of course equal and opposite to modifying vector —B′M which is determined by the same signal current in the opposite direction from terminal $e_2$ to terminal $e_3$. Similarly, modifying vectors —R″U and —B′N are equal in magnitude and oppositely directed, being determined by the signal current flowing from terminal $e_4$ to terminal $e_3$ and vice versa, respectively. The resultant of modifying vectors —B′M and —B′N, or vector —B′C′, when added to vector —OB′ at terminal $e_3$, yields desired vector OC′. Thus, there is a unique set of demodulation angles for achieving the desired driving signals for the active common emitter matrix, these angles being dependent on the detailed specifications of the desired net driving signals for the three electron guns of picture tube 12, while also avoiding the necessity for clamping circuits or separate bias sources for the active matrix. In short, the vector diagram demonstrates that the π-type matrix of the demodulation system, driven by push-pull currents proportional to gain vector ±OR″ and ±OB′ of equal amplitude derived by demodulating the chrominance signal at proper phase angles as previously explained, makes available as output voltages color-control signals determined by gain vectors OB′, and OC′ as required to drive active matrix 14 to establish as modified color-control signals the desired output-signal gain vectors OB, OR and OG, which correspond to the applied driving-signal gain vectors but with their common-mode information deleted.

Signals dependent on gain vectors OB′, OR′ and OC′ are delivered from demodulation system 16 to active matrix 14 by constructing the $\pi$-matrix within the demodulator so that resistor $R_{23}$ has a value of 10.7R and resistor $R_{34}$ has a value of 1.81R. This may well result in resistive values that are inconveniently high for processing as integrated circuits and, therefore, it is preferred to use an equivalent Y-type matrix, as shown in FIGURE 1. The resistive values of the Y-matrix are obtained by known transformations from the $\pi$-matrix of FIGURE 3*a*, and representative values are set forth in FIGURE 1. With the Y-type matrix, all of the resistors are of the same order of magnitude and are relatively low in value which is of great advantage in producing the demodulation system in the form of an integrated circuit.

The response of active matrix 14 to the driving signals supplied by demodulation system 16 is also represented in FIGURE 3. The signals applied to the active matrix are determined by vectors OB′, OR′ and OC′ and may be considered to constitute a set of color-control signals.

As explained, the signal proportional to vector OB′ is taken off load impedance 21 of transistor 20 and is applied via transistor 81 to the base of transistor 51. The signal determined by vector OR′ is derived at matrix 26–27–28 and is applied via transistor 82 to the base of transistor 52. And the signal proportional to vector OC′ is taken at the junction of matrix resistors 26 and 42 and is applied via transistor 80 to the base of transistor 50.

Each of these signals contains common-mode information as explained above and that common-mode information is eliminated in the active matrix 14. This is the equivalent of adding the signal proportional to vector OG to each of the signals applied to each of transistors 50–53. As a consequence, disregarding the luminance signal input to transistor 60, output signals are obtained in the collector circuits of transistors 50–53 in proportion to vectors OC, OB, OR, and OG respectively of FIGURE 3. Of these, the signal developed in the collector circuit of transistor 50 is not utilized. The remaining three modified color-control signals are color-difference signals that may, if desired, be applied to assigned ones of the three electron guns included within picture tube 12.

The operation as explained to this point results in color-difference signals in the collector circuits of transistors 51–53 but it will be observed that transistor 60, serving as the common emitter impedance of matrix 14, is, in effect, a source of luminance or Y signal. This matrixes with the color-difference signals to the end that the $R_1$, $B_1$ and $G_1$ signals drive the picture tube directly. This is to be distinguished from the alternative practice in which the luminance signal is applied to one input electrode of each gun in the tri-color tube while a color-difference signal is applied to the other electrode, relying on internal matrixing within the color tube to develop the primary color signals.

It will be observed that the various signal paths from the collectors of demodulation system 16 through to the grids of picture tube 12 feature direct current coupling. Another feature of the arrangement is that corresponding points of these various paths are maintained at the same direct current level. These are desirable attributes of the arrangement of FIGURE 1. Of course, another highly attractive feature is that there is no need for filtering subsequent to demodulation system 16 in view of the fact that it is a balanced network and, therefore, neither the injection nor chrominance signals appear in its output.

One embodiment of active matrix 14 and demodulation system 16 that has been constructed and successfully operated employed component values as shown within parentheses in FIGURE 1. The peak-to-peak value of the injection signal was 1 volt; the chrominance signal input was approximately 0.1 volt, the output signals from demodulation system 16 had a peak-to-peak value within the range 10 to 15 volts, and the level of signal applied to the picture tube grids was approximately 150 volts.

Figure 4:
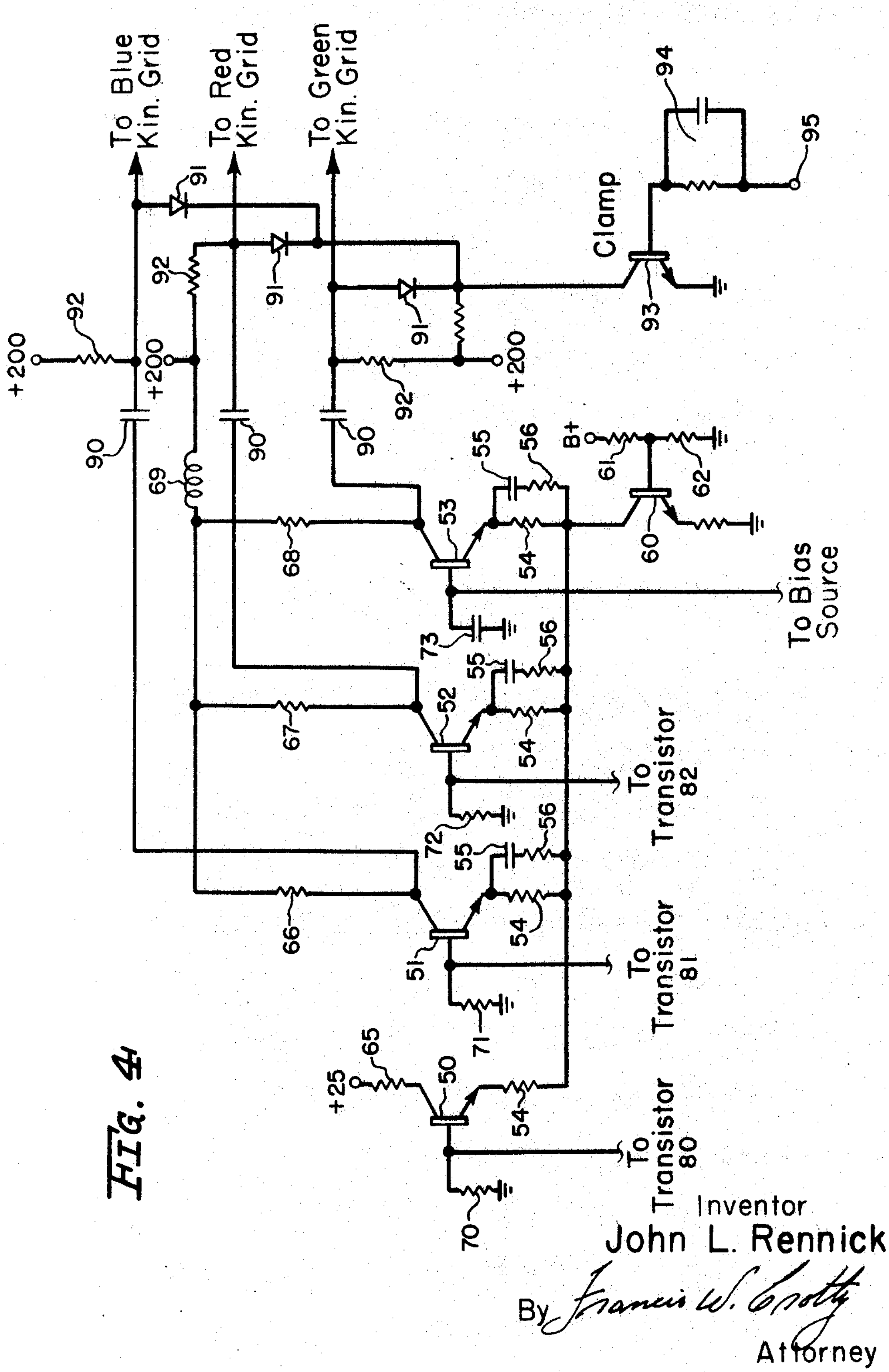
FIGURE 4 shows a modified form of matrixing system of the invention for driving a three-color cathode-ray tube.

It, of course, is not necessary to use D.C. coupling throughout although that is usually preferred. The modification of FIGURE 4 shows a form of active matrix differing from unit 14 of FIGURE 1 in two respects. The color-difference signals are applied to the grids of the picture tube through capacitors 90. Where capacitive coupling is employed, it is desirable to adopt the known technique of D.C. restoration just prior to the picture tube grids and this is accomplished in the customary way by diodes 91 that are periodically keyed to establish a voltage on capacitors 90 and by discharge resistors 92 for such capacitors. The anodes of all diodes 91 connect to the collector of a transistor 93 having a grounded emitter and having its base connected through a resistance-capacitance network 94 to a convenient source 95 of positive pulses occurring at the horizontal repetition frequency. They may be readily derived, for example, from the horizontal sweep system and they serve to render the restoration diodes 91 effective, in known manner, during horizontal retrace intervals only.

Another change in FIGURE 4 over that of FIGURE 1 is that transistor 60, serving as the common emitter impedance of the active matrix, is no longer employed for adding the luminance signal into the matrix. Where this modification is adopted, color-difference signals are applied to the grids of the color picture tube and the luminance signal is applied to its cathode so that internal matrixing is accomplished in the usual way to derive the desired primary color signals.

Those portions of active matrix 14 and demodulation system 16 enclosed within broken-construction line may well be constructed as integrated circuits. The transistors are preferably identical and the resistances have reasonable and readily ascertainable values. There are a minimum of capacitors employed and there are no inductors.

The vector diagram of FIGURE 3 is predicated on an emitter resistor 54 for transistor 50 of the active matrix which is 1.04 times the emitter resistors individual to the other transistors 51–53 of that matrix. These values are so close that the arrangement may be operated with emitter resistors of the same value throughout matrix 14 without substantial degradation. Moreover, as explained in connection with Equations 1 to 3, image reproduction is assumed to be with normal white chosen near 9300° Kelvin. Of course, the described arrangement is equally useful for other colorimetric constants, including for example those defining white at illuminant C. It will be understood that operation with white at illuminant C necessitates specifically different values of the vectors OR, OB and OG in FIGURE 3, different as to phase and amplitude. Starting with a new plot of these quantities to satisfy the conditions of image reconstruction, one may determine the demodulation angles and the other parameters, such as the resistors of the passive matrix, necessary to develop appropriate driving or input signals for active matrix 14.

The described technique of adopting common-mode information equal to −OG is preferred, but other specifically different determinations of the common-mode information may be used. Additionally, while active matrix 14 cooperates especially well with demodulation system 16, it will be understood that each is useful without the other.

In the introductory portions of this description, reference has been made to the suitability of the balanced demodulator of the invention for the reception of stereophonic frequency modulation broadcasts. In that environment, the demodulator comprising transistors 20, 20′, 25, and 20″, 25″ with a simple collector loads for transistors 20 and 25 would suffice. The demodulation signal may be applied, for example, to the base of transistors 20 and 25 and should correspond in frequency and be locked in phase to the subcarrier frequency of the suppressed-carrier amplitude-modulated component of the stereophonic broadcast conforming to the specifications of the Federal Communications Commission.

The signal applied, in this case, through the linear-mode differential amplifier 20″, 25″ would be the composite output signal of the principal signal detector of the FM receiver. The response of the balanced demodulator to these signals would be a balanced output representing the modulation of the suppressed-carrier amplitude-modulated subcarrier. More specifically, it would represent the difference information of the two audio signals characteristically employed in stereo reproduction. It is understood that one of signal components of the output of the principal signal demodulator of the receiver constitutes the sum information of the same two audio signals and any conventional matrixing scheme permits the recovery of the two audio signals separated from one another for application to individual left and right amplifier systems all in a manner that is well understood in the art. An advantage to the described balanced demodulator in the FM stereo application is that only the desirable stereophonic information is applied to the audio amplifiers. Other information that may be included in the broadcast, such as storecasting that is permitted under present practices, is rejected due to the fact that signal components developed in the load impedances of the balanced demodulator and corresponding to the applied signals, as distinguished from the modulation components thereof, are cancelled out. In other words, there is no need for the protection of expensive filters following the stereo demodulators.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A balanced color demodulation system for deriving three color control signals for controlling a color image reproducing device which comprises:

two color demodulators each of which includes the following.

(a) a first and a second differential amplifier individually including a pair of balanced transistors having input, output and common electrodes and further individually including a load resistor connecting the output electrode of one transistor of its transistor pair to a plane of fixed reference potential;

(b) conductive connections cross coupling said load resistors to the collector electrode of the other transistor of said transistor pair of said first and second amplifiers;

(c) a third pair of balanced transistors individually having input, output and common electrodes with the output-common electrode path of each constituting a common high impedance connected to said common electrodes of said transistor pairs of said first and second amplifiers, respectively, and (d) another high impedance connected with said common electrodes of said third transistor pair to constitute therewith a third differential amplifier operating in its linear mode;

means for applying to said first and second differential amplifiers of one of said demodulators a chrominance signal, phase-and amplitude modulated with color information of an image being transmitted, and a demodulating signal, having a frequency corresponding to the fundamental of said chrominance signal, one of said signals being applied through said third differential amplifier of said one demodulator with a phase relative to the other of said signals to develop in said load resistors of said one demodulator opposite polarities of a first color control signal;

means for similarly applying said chominance and said demodulating signals to the other of said demodulators but with a different relative phase to develop in said load resistors of said other demodulator opposite polarities of a second color control signal;

and a resistance matrix network comprising resistors included in both of said two demodulators and constituting cross connections between collector electrodes of said transistor pairs of said first and second amplifiers of said two demodulators to matrix said first and second color control signals and develop a third color control signal.

2. A balanced color demodulator system in accordance with claim 1 in which the collector load impedance of the first differential amplifier of one of said two demodulators has a predetermined value;

in which the remaining collector load impedances of said two demodulators define wye-type resistance matrices;

and in which the resistors of said matrices are of the same order of magnitude as said predetermined value.

3. A balanced color demodulation system in accordance with claim 1 in which said high impedance connected with said common electrodes of said third transistor pair of each of said two color demodulators comprises the output-common electrode path of still another transistor.

4. A balanced color demodulation system in accordance with claim 1 in which the parameters of said matrix are determined in relation to the relative phases of said chrominance and demodulating signals, as applied to said two color demodulators, to derive a set of three color-difference signals, such as *R—Y, B—Y* and *G—Y*, where Y represents luminance information and R, B and G represent primary color information.

5. A balanced color demodulation system in accordance with claim 1 in which said resistance matrix includes resistors connecting output electrodes of said first and second amplifiers of both said color demodulators to a plane of reference potential to establish in the load circuits of said output electrodes circuit points which are at the same direct-current potential level in the absence of signals appplied to said demodulators, and in which said resistors of said matrix which constitute said cross connections are bridged between said points which are at the same D.C. potential level.

6. A balanced color demodulation system in accordance with claim 1 in which there are at least three of said circuit points at the same D.C. potential level constituting output terminals of said two demodulators, and in which three emitter followers are conductively connected to said output terminals to derive said first, second and third color control signals from said demodulators.

7. A matrix system for a television receiver for developing three color-control signals for use in reproducing an image in simulated natural color comprising:

four active electron devices individually having input, output and common electrodes;

a high impedance connected in common to said common electrode of all said devices;

individual load impedances connected to said output electrodes of said devices, respectively;

means for applying at least three color-control signals to the input electrodes of assigned ones of said devices, respectively, to develop in said load impedances four modified color-control signals the summation of which equals zero;

and means for deriving output signals from three of said load impedances for utilization in image reproduction.

8. A matrix system in accordance with claim 7 in which the input electrode of one of said devices is maintained at a fixed reference potential at color-control signal frequencies;

in which said control signals are applied, respectively, to the remainder of said devices;

and in which an output signal is derived from the load impedance of said one device.

9. A matrix system in accordance with claim 8 in which said color-control signals applied to said remainder of said devices have as common-mode information the modified color-control signal desired to be developed in said load impedance of said one device.

10. A matrix system in accordance with claim 9 for a three-color television receiver in which said means for applying said color-control signals comprises a pair of balanced, equal gain demodulators for demodulating a chrominance signal that is phase-and amplitude-modulated with color information to derive a pair of balanced, phase-displaced signals;

and a second matrix responsive to said balanced signals to produce three output signals having common-mode information corresponding to said one modified color-control signal.

11. A matrix system in accordance with claim 10 in which said demodulating means comprises two inductorless balanced product mixers individually including a pair of cross-coupled transistor-type differential amplifiers and collectively developing a pair of balanced signals each of which represents an assigned one of the three color components of an image being transmitted:

in which said second matrix is a resistance matrix for developing from said balanced signals three color-control signals for application to said matrix system, two of which color-control signals include common-mode information representing the third color component of said image.

12. A matrix system in accordance with claim 11 in which corresponding points in the signals of said demodulating means and said matrix system are maintained at the same direct current level.

13. A matrix system in accordance with claim 7 in which said modified color-control signals are color-difference signals;

in which said high impedance connected to said common electrodes is a source of luminance signal for matrixing with said color-difference signals;

and in which said output signals are primary color signals.

14. A matrix system in accordance with claim 7 for applying energizing signals to a color picture cathode-ray tube having three signal grids each with a predetermined input capacitance, in which said active devices comprise transistors, in which an emitter resistor is provided for each transistor from which an output signal is derived, and in which each such emitter resistor is shunted by a resistance-capacitance peaking circuit for compensating said input capacitance of said signal grids.

15. A color demodulator for a three-color television receiver for utilizing a chrominance signal phase-and amplitude-modulated with hue and saturation in formation of an image being transmitted comprising:

means, including a pair of synchronous product mixers, for deriving from said chrominance signal a pair of balanced signals representing two color components of said image;

and means, including a resistive matrix, for deriving from said balanced signals at least two color-control signals individually having common-mode information representing the third color component of said image.

16. In a color television system for utilizing three predetermined color-control signals in reproducing an image in simulated natural color, the combination comprising:

means, including a demodulator and a first matrix, responsive to a subcarrier modulated with hue and saturation information of an image being translated for deriving a first pair of color-control signals corresponding to the vector addition of one of said predetermined color-control signals with each of the remaniing two of said predetermined color control signals, respectively;

means, including a second matrix, for effectively combining said first pair of color-control signals with said one predetermined color-control signal to derive said remaining two of said predetermined color-control signals;

and means for utilizing said predetermined color-control signals in reproducing said image.

17. The combination in accordance with claim 16 in which said one predetermined color-control signal is common-mode information of said first paid of color-control signals;

and in which said means for deriving said remaining two predetermined color-control signals comprises means for eliminating said common-mode information.

18. The combination in accordance with claim 17 in which said means for eliminating common mode information is an active matrix including at least three active electron devices individually having input, output and common electrodes;

in which said output electrodes connect to individual output load impedances while said common electrodes all connect to a common high impedance;

in which said first pair of color-control signals are applied to said input electrodes of two of said active devices;

and in which said input electrodes of the third one of said active devices is maintained at signal ground.

References Cited

UNITED STATES PATENTS

| | | | |
|---|---|---|---|
| 2,732,425 | 1/1956 | Pritchard | 178—5.4 |
| 2,925,462 | 2/1960 | Pritchard | 178—5.4 |
| 3,241,078 | 3/1966 | Jones | 329—50 |

ROBERT L. GRIFFIN, Primary Examiner

J. C. MARTIN, Assistant Examiner